US011616357B2

(12) United States Patent
Hrncir, Jr.

(10) Patent No.: US 11,616,357 B2
(45) Date of Patent: Mar. 28, 2023

(54) FUSE CLEARING APPARATUS FOR MEDIUM-VOLTAGE SUBSTATION APPLICATIONS

(71) Applicant: Eaton Intelligent Power Limited, Dublin (IE)

(72) Inventor: Daniel Edward Hrncir, Jr., Arden, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/237,325

(22) Filed: Apr. 22, 2021

(65) Prior Publication Data

US 2022/0344928 A1 Oct. 27, 2022

(51) Int. Cl.
| H02H 7/22 | (2006.01) |
| H02H 1/00 | (2006.01) |
| H02H 3/00 | (2006.01) |
| H02H 3/08 | (2006.01) |
| H01H 83/20 | (2006.01) |

(52) U.S. Cl.
CPC .......... *H02H 7/222* (2013.01); *H02H 1/0015* (2013.01); *H02H 3/00* (2013.01); *H01H 83/20* (2013.01); *H01H 2083/201* (2013.01); *H02H 3/08* (2013.01)

(58) Field of Classification Search
CPC .. H02H 3/00; H02H 7/04; H02H 3/08; H02H 1/0023; H02H 3/0935; H02H 7/06; H02H 1/0015; H02H 3/16; H02H 3/083; H02H 3/165; H02H 7/22; H02H 7/222; H01F 38/00; H01H 2083/201; H01H 83/20

USPC .......................................................... 361/2, 35
See application file for complete search history.

(56) References Cited

U.S. PATENT DOCUMENTS

| 5,216,356 | A | 6/1993 | Owen |
| 6,141,192 | A | 10/2000 | Garzon et al. |
| 8,319,136 | B2 | 11/2012 | Byron et al. |
| 9,048,039 | B2 | 6/2015 | Crane et al. |
| 9,570,901 | B2 | 2/2017 | Shea et al. |
| 2003/0231453 | A1 | 12/2003 | Shea |
| 2014/0239812 | A1* | 8/2014 | Valdes ..................... H05H 1/52 315/111.21 |
| 2016/0276821 | A1* | 9/2016 | Politis ....................... H02H 3/08 |
| 2020/0373741 | A1* | 11/2020 | Zhou ......................... H01T 4/04 |

FOREIGN PATENT DOCUMENTS

| CN | 201146387 Y | 11/2008 |
| EP | 2624396 A2 | 8/2013 |
| GB | 2251130 A | 6/1992 |
| WO | WO-2015062644 A1 | 5/2015 |

OTHER PUBLICATIONS

International Search Report and Written Opinion; International Application No. PCT/EP2022/025152; dated Aug. 12, 2022, 16 pages.

* cited by examiner

*Primary Examiner* — Danny Nguyen
(74) *Attorney, Agent, or Firm* — Stanek Lemon Crouse & Meeks, P.A.

(57) ABSTRACT

An apparatus includes at least one fuse clearing switch operable to create a fault on at least one AC line between a fuse and a transformer of a substation. The apparatus further includes a control system configured to be coupled to an arc detector and to operate the at least one fuse clearing switch responsive to a control signal produced by the arc detector.

19 Claims, 5 Drawing Sheets

FUSE CLEARING APPARATUS FOR MEDIUM-VOLTAGE SUBSTATION APPLICATIONS

BACKGROUND

The inventive subject matter relates to electrical power apparatus and methods and, more particularly, to circuit protection apparatus and methods.

Electrical switchgear typically refers to a centralized collection of circuit breakers, fuses and switches (circuit protection devices) that function to protect, control and isolate electrical equipment. In some applications, low voltage (LV) switchgear may be included in a substation that interfaces the switchgear to a medium voltage (MV) power distribution system.

Of particular concern in the operation of switchgear is the potential for faults that create high-energy arcs that generate heat and gases that can injure personnel and damage equipment. The severity of an arc fault can be reduced by using an arc mitigation device that creates a controlled fault within a hardened container to reduce the arc energy. An example of such a device is described in U.S. Pat. No. 10,523,000 to Shea et al.

SUMMARY

Some embodiments of the inventive subject matter provide an apparatus including at least one fuse clearing switch operable to create a fault on at least one AC line between a fuse and a transformer of a substation. The apparatus further includes a control system configured to be coupled to an arc detector and to operate the at least one fuse clearing switch responsive to a control signal produced by the arc detector.

In some embodiments, the at least on AC line may include a first AC line, a second AC line and a third AC line corresponding to first, second and third phases, respectively. The at least one fuse clearing switch may include a first switch configured to couple the first AC line and the second AC line and a second switch configured to couple the second AC line and the third AC line. The first switch and the second switch may include a first vacuum circuit interrupter and a second vacuum circuit interrupter, respectively.

According to further aspects, the control system may include a switch actuator mechanism coupled to the at least one fuse clearing switch and a control circuit configured to cause the switch actuator mechanism to transition the at least one fuse clearing switch to a fault creating state responsive to an arc detection signal from an arc detector. The apparatus may further include an interlock mechanism operatively coupled to the switch actuator mechanism and configured to prevent closing of a disconnect switch upstream of the at least one fuse responsive to the at least one fuse clearing switch transitioning to the fault creating state. The interlock mechanism may be configured to prevent closing of a door of a housing for the disconnect switch. For example, the interlock mechanism may be configured to actuate a door blocking device of the housing via a cable coupling.

Further embodiments provide an apparatus including a first switch coupled to a first phase of a multiphase AC bus between a first fuse and a transformer of a substation and to a second phase of the multiphase AC bus between a second fuse and the transformer and a second switch coupled to the second phase of a multiphase AC bus between the second fuse and the transformer and to a third phase of the multiphase AC bus between a third fuse and the transformer. The apparatus further includes a switch actuator mechanism configured to close the first switch and the second switch and a control circuit configured to be coupled to an arc detector and to cause the switch actuator mechanism to operate the first and second fuse clearing switches responsive to a control signal from the arc detector. The apparatus may further include an interlock mechanism operatively coupled to the switch actuator mechanism and configured to prevent closing of a disconnect switch upstream of the first fuse, the second fuse and the third fuse responsive to the switch actuator mechanism transitioning the first switch and the second switch to a fault creating state.

Additional embodiments provide a system including a transformer, an arc detector configured to detect an arc downstream of the transformer, a disconnect switch configured to couple and decouple an input of the transformer to and from an AC source, and at least one fuse coupled to an output of the disconnect switch. The system further includes at least one fuse clearing switch configured to create a fault on at least one AC line between the at least one fuse and the input of the transformer and a control system coupled to the arc detector and configured to operate the at least one fuse clearing switch responsive to a control signal produced by the arc detector.

DETAILED DESCRIPTION

Figure 1:
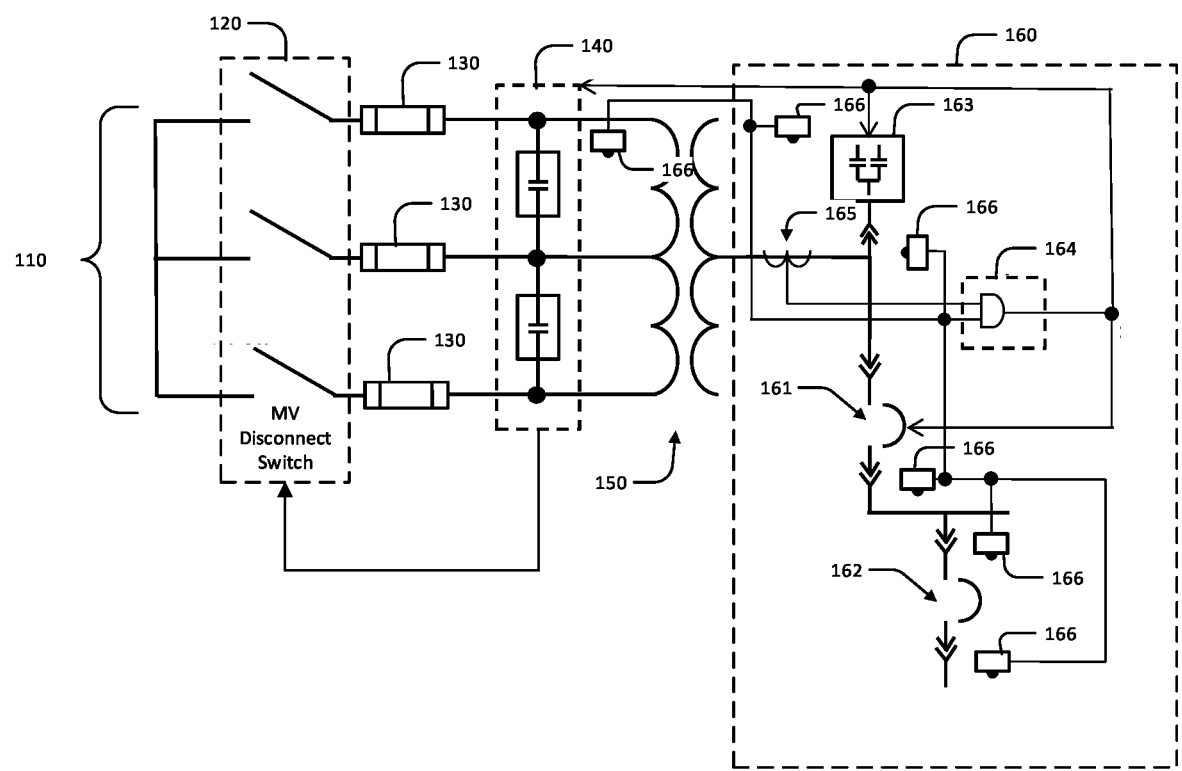
FIG. 1 is a schematic diagram illustrating an application for a fuse clearing switch arrangement in a medium voltage (MV) substation according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

A typical substation uses a medium voltage switch and fuses on the primary side of the substation transformer. When an arc-generating fault occurs downstream of the transformer, a fast acting low-voltage arc mitigation (quenching) device can eliminate the arcing event in under 4 ms. Some embodiments of the inventive subject matter arise from a realization that the medium voltage current limiting fuses at the substation input should clear as quickly as possible to reduce the time that fault current is flowing into the arc mitigation device and ensure that the disconnect switch can be operated under safe conditions. Some embodiments of the invention use a fuse clearing device, such as a set of shorting switches coupled downstream of the current limiting fuses and triggered by an arc detector to create a low impedance fault at the load side of the fuses. This can reduce the time fault level current is flowing into the arc mitigation device and also help ensure safe operation of the substation disconnect switch.

FIG. 1 illustrates a substation (e.g., a unitized substation) for interfacing a MV power distribution system to LV equipment. LV equipment in the substation may include switchgear, such as circuit breakers, disconnect switches and the like, which may be used to distribute power to other electrical equipment. The substation includes a transformer 150 which has a primary winding coupled to a three-phase MV bus 110, by a disconnect switch 120 and a set of fuses 130. A secondary side of the transformer 150 is connected to LV switchgear, here shown as including a main breaker 161 and one or more feeder breakers 162 that provide power to downstream electrical equipment.

An arc detector 164 is configured to detect the presence of an arc-generating fault in the switchgear or other parts of the substation. As shown, the arc detector 164 may be configured to receive signals from one or more current sensors 165 and one or more light sensors 166 positioned at various locations in the substation. Responsive to signals received from the current sensors 165 and light sensors 166 indicating the presence of an arc-generating fault, the arc detector 164 generates a control signal that activates an arc mitigation device 163 connected to the secondary of the transformer 150. The arc mitigation device 163 may reduce energy of the arc created by the fault by initiating a controlled fault that diverts energy from the original fault. For example, the controlled fault may be created by shorting together phase conductors of the low-voltage distribution system within an arc-resistant container that inhibits distribution of arc-generated heat and gases. The arc detector 164 and the arc mitigation device 163 may, for example, operate in a manner along the lines described in U.S. Pat. No. 10,523,000 to Shea et al., the content of which is incorporated herein by reference in its entirety.

The system further includes a fuse clearing switch 140 that is coupled to the AC lines between the fuses 130 and the transformer 150 and configured to operate responsive to the arc detector 164. Responsive to the arc detector 164 detecting an arc-creating fault, the fuse clearing switch 140 creates a low impedance fault (e.g., a short circuit) on the primary side of the transformer 150 and downstream of the fuses 130. The fault created by the fuse clearing switch 140 forces the fuses 130 to clear (open) in response to the fault detected by the arc fault detector 164. This can protect the arc mitigation device 163 from prolonged exposure to fault current and foreclose the possibility of an operator operating the disconnect switch 120 during a fault created by the arc mitigation device 163.

As further shown, additional safety can be provided by interlocking operation of the disconnect switch 120 with operation of the fuse clearing switch 140. In particular, this interlocking can prevent closure of the disconnect switch 120 when the fuse clearing switch 140 is in a fault creating condition. This aspect may be particularly advantageous because it can prevent an operator from closing the disconnect switch 120 before the fuse clearing switch 140 is reset, which could pose a danger to the operator and other personnel and lead to damage of the equipment. For example, in some embodiments, such interlocking may involve preventing a door of a housing of the disconnect switch 120 from being closed, thus activating an interlock mechanism that prevents closure of the disconnect switch 120 when the door is open.

Figure 2:
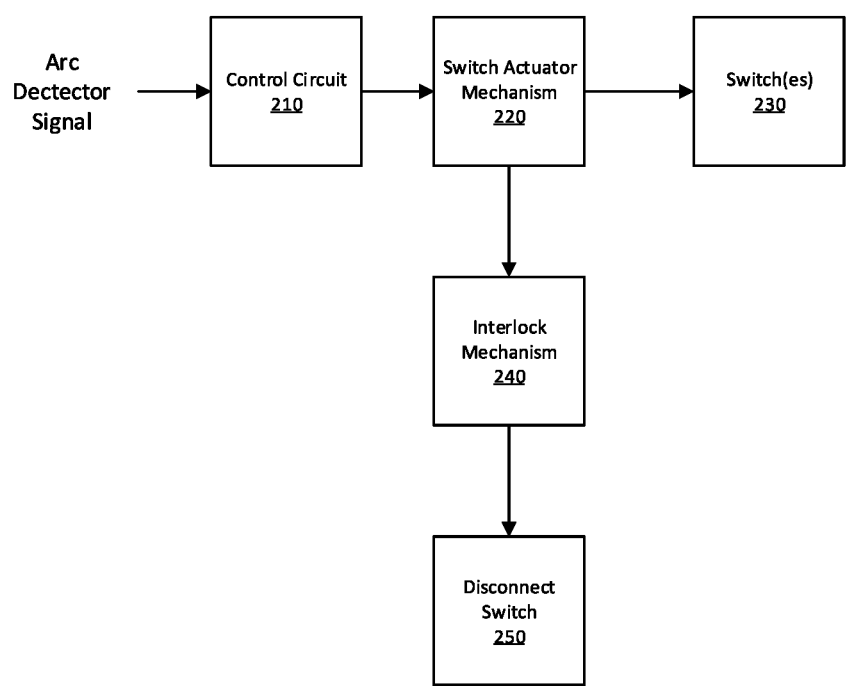
FIG. 2 is a schematic diagram of a fuse clearing switch apparatus according to further embodiments.

FIG. 2 is a block diagram of a fuse clearing apparatus according to some embodiments. The apparatus includes one or more switches 230 that are operable to create a fault on one or more AC lines at a primary side of a transformer of a substation along the lines discussed above with reference to FIG. 1. A switch actuator mechanism 220 is configured to operate the switch(es) 230 under control of a control circuit 210. The control circuit 210 is configured to operate the switch actuator mechanism 220 responsive to a control signal received from an arc detector. As further shown, the switch actuator mechanism 220 may also be configured to interoperate with an interlock mechanism 240 that is enables and disables operation of the disconnect switch 250.

Figure 3:
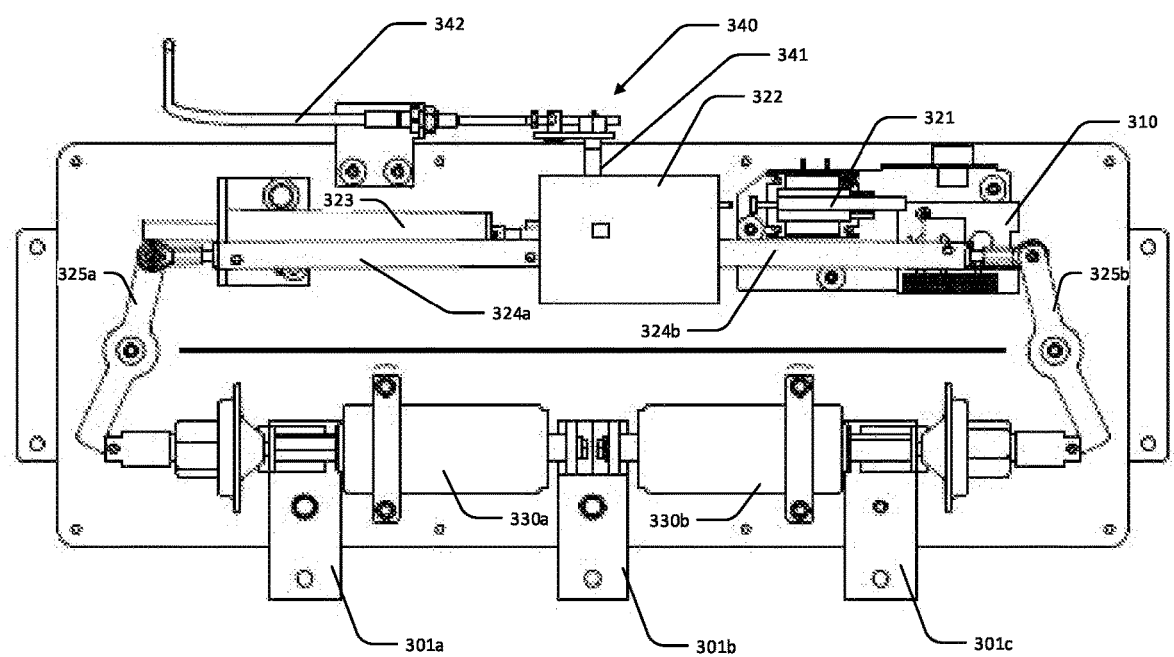
FIG. 3 illustrates a fuse clearing switch using vacuum circuit interrupters according to some embodiments.
Figure 4:
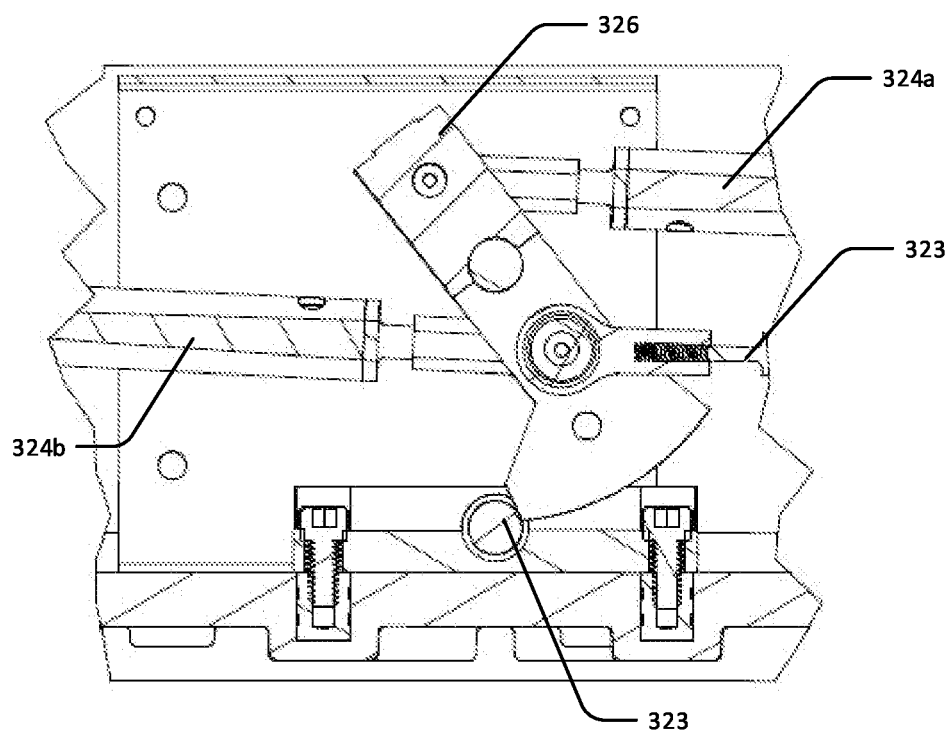
FIG. 4 illustrates a switch actuator mechanism and interlock cable mechanism of the apparatus of FIG. 3.
Figure 5:
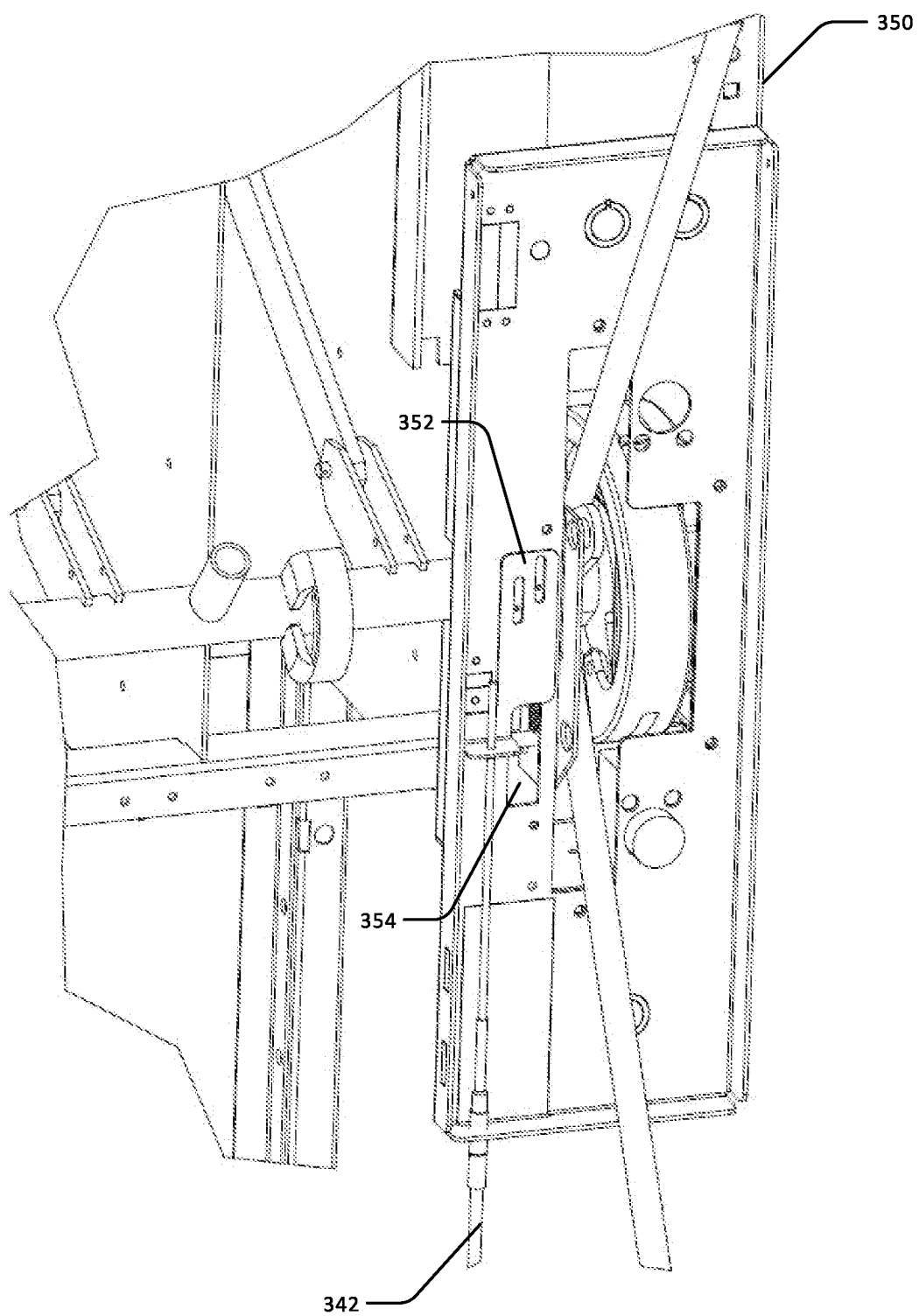
FIG. 5 illustrates a door blocking mechanism actuated by the interlock cable mechanism of FIG. 4.

FIGS. 3-5 illustrate an exemplary implementation of a fuse clearing apparatus along the lines described above according to further embodiments. Referring to FIG. 3, the device includes a first vacuum circuit interrupter 330a having a first terminal connected to a first bus bar 310a and a second terminal connected to a second bus bar 301b. A second vacuum circuit interrupter 330b has a first terminal connected to the second bus bar 301b and a second terminal connected to a third bus bar 301c. The vacuum circuit interrupters 330a, 330b are actuated by a switch actuation mechanism driven by a spring-loaded drive mechanism 322 that actuates push rods 324a, 324b using energy stored in a compression spring 323, which is pre-charged to prepare the apparatus for operation. When triggered by a solenoid 321, the drive mechanism 322 drives the pushrods 324a, 324b, which close the respective vacuum circuit interrupters 330a, 330b using force translated through respective rocker arms 325a, 325b.

As shown in FIG. 4, the pushrods 324a, 324b may be connected to a crank arm 326 that pivots to actuate the pushrods 324a, 324b responsive to the release of energy stored in the compression spring 323. In particular, the crank arm 326 is retained in a spring-loaded position by a D-latch 328 and released responsive to actuation of the solenoid 321, causing the crank arm 326 to pivot and move the pushrods 324a, 324b under power of the compression spring 323. The triggering solenoid 321 is controlled by a control circuit 310, which may activate the solenoid 321 responsive to a control signal received from an arc detector, along the lines described above.

As further shown in FIGS. 3-5, the apparatus may further include an interlock mechanism 340 that operates responsive to the drive mechanism 322. In particular, the interlock mechanism 340 includes a cable 342 that is configured to be actuated responsive to operation of the drive mechanism 322 via a linking arm 314 coupled to the crank arm 326. Movement of the cable 342 moves a blocking plate 352 to prevent insertion of a door latch into an opening 354 in the housing 350 of a disconnect switch housing 350. This can prevent closure of a door of the housing 350 when the drive mechanism 322 causes the vacuum circuit interrupters 330a, 330b to close and create faults between the bus bars 301a, 301b, 301c. By preventing closure of the door of the disconnect switch housing 350, operation of the disconnect switch in the housing 350 may be prevented due to operation of another interlock (not shown) that prevents operation of the disconnect switch when the door of the housing 350 is open.

It will be appreciated that the apparatus illustrated in FIGS. 3-5 is described for purposes of illustration, and that other mechanical and electrical arrangements may be used in other embodiments. For example, some embodiments may use other mechanisms to operate vacuum circuit interrupter based fuse clearing switches and may have a mechanical arrangement that differs from that shown in FIG. 3. Other embodiments may use interlocks having other than the mechanical cable-based implementation shown in FIGS. 3-5, such as interlocks using hydraulic or electromechanical devices.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   at least one fuse clearing switch operable to create a fault on at least one AC line between a fuse and a transformer of a substation;
   a control system configured to be coupled to an arc detector and to operate the at least one fuse clearing switch responsive to a control signal produced by the arc detector; and
   an interlock mechanism operatively coupled to the control system and configured to prevent closing of a disconnect switch upstream of the fuse responsive to the at least one fuse clearing switch transitioning to a fault creating state.

2. The apparatus of claim 1, wherein the at least one AC line comprises a first AC line, a second AC line and a third AC line corresponding to first, second and third phases, respectively, and wherein the at least one fuse clearing switch comprises:
   a first switch configured to couple the first AC line and the second AC line; and
   a second switch configured to couple the second AC line and the third AC line.

3. The apparatus of claim 2, wherein the first switch and the second switch comprise a first vacuum circuit interrupter and a second vacuum circuit interrupter, respectively.

4. The apparatus of claim 1, wherein the control system comprises:
   a switch actuator mechanism coupled to the at least one fuse clearing switch; and
   a control circuit configured to cause the switch actuator mechanism to transition the at least one fuse clearing switch to the fault creating state responsive to an arc detection signal from the arc detector.

5. The apparatus of claim 4, wherein the interlock mechanism is operatively coupled to the switch actuator mechanism.

6. The apparatus of claim 1, wherein the interlock mechanism is configured to prevent closing of a door of a housing for the disconnect switch.

7. The apparatus of claim 6, wherein the interlock mechanism is configured to actuate a door blocking device of the housing via a cable coupling.

8. An apparatus comprising:
   a first switch coupled to a first phase of a multiphase AC bus between a first fuse and a transformer of a substation and to a second phase of the multiphase AC bus between a second fuse and the transformer;
   a second switch coupled to the second phase of the multiphase AC bus between the second fuse and the transformer and to a third phase of the multiphase AC bus between a third fuse and the transformer;
   a switch actuator mechanism configured to close the first switch and the second switch;
   a control circuit configured to be coupled to an arc detector and to cause the switch actuator mechanism to operate the first and second fuse clearing switches responsive to a control signal from the arc detector; and
   an interlock mechanism operatively coupled to the switch actuator mechanism and configured to prevent closing of a disconnect switch upstream of the first fuse, the second fuse and the third fuse responsive to the switch actuator mechanism transitioning the first switch and the second switch to a fault creating state.

9. The apparatus of claim 8, wherein the first switch and the second switch comprise a first vacuum circuit interrupter and a second vacuum circuit interrupter, respectively.

10. The apparatus of claim 8, wherein the interlock mechanism is configured to prevent closing of a door of a housing for the disconnect switch.

11. The apparatus of claim 10, wherein the interlock mechanism is configured to actuate a door blocking device of the housing via a cable coupling.

12. A system comprising:
   a transformer;
   an arc detector configured to detect an arc downstream of the transformer;
   a disconnect switch configured to couple and decouple an input of the transformer to and from an AC source;
   at least one fuse coupled to an output of the disconnect switch;
   at least one fuse clearing switch configured to create a fault on at least one AC line between the at least one fuse and the input of the transformer;
   a control system coupled to the arc detector and configured to operate the at least one fuse clearing switch responsive to a control signal produced by the arc detector; and
   an interlock mechanism operatively coupled to the control system and configured to prevent closing of the disconnect switch responsive to a transition of the at least one fuse clearing switch to a fault creating state.

13. The system of claim 12, wherein the at least one AC line comprises a first AC line, a second AC line and a third AC line corresponding to first, second and third phases, respectively, and wherein the at least one fuse clearing switch comprises:
   a first switch configured to couple the first AC line and the second AC line; and a second switch configured to couple the second AC line and the third AC line.

14. The system of claim 13, wherein the first switch and the second switch comprise a first vacuum circuit interrupter and a second vacuum interrupter, respectively.

15. The system of claim 12, wherein the control system comprises:
   a switch actuator mechanism coupled to the at least one fuse clearing switch; and
   a control circuit configured to cause the switch actuator mechanism to transition the at least one fuse clearing switch to the fault creating state responsive to the control signal from the arc detector.

16. The system of claim 15, wherein the interlock mechanism is operatively coupled to the switch actuator mechanism.

17. The system of claim 16, wherein the interlock mechanism is configured to prevent closing of a door of a housing for the disconnect switch.

18. The system of claim 17, wherein the interlock mechanism is configured to actuate a door blocking device of the housing via a cable coupling.

19. The system of claim 12, further comprising switchgear coupled downstream of the transformer.

* * * * *